J. HALLSWORTH.
HYDROCARBON BURNER.
APPLICATION FILED OCT. 20, 1913.
1,098,721.
Patented June 2, 1914.
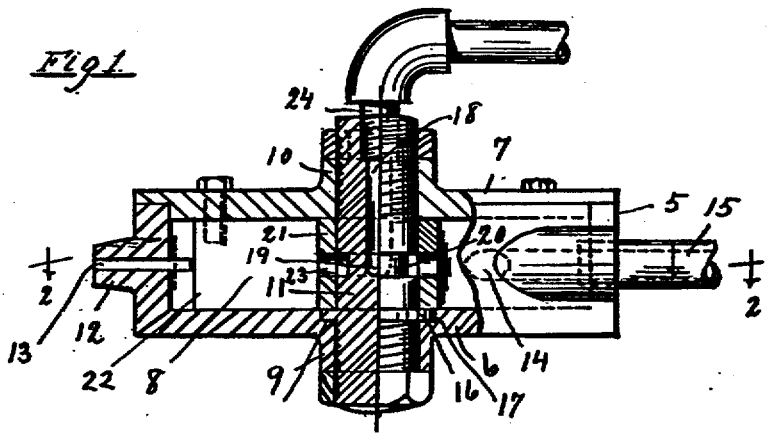
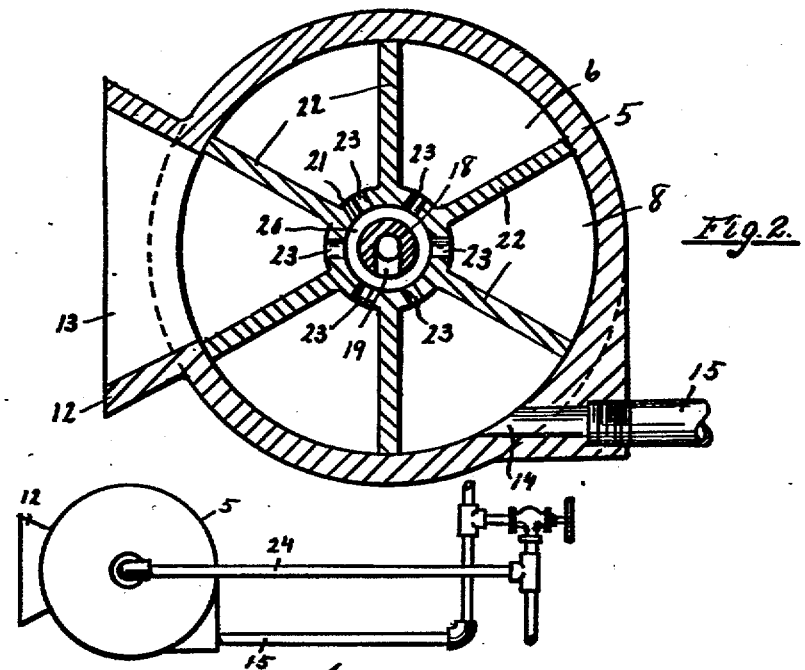
WITNESSES.
Frank Waterfield
E. P. Parkes.
INVENTOR
JAMES HALLSWORTH.
by Marshall Tilden
Attorney

UNITED STATES PATENT OFFICE.

JAMES HALLSWORTH, OF OATMAN, ARIZONA, ASSIGNOR OF ONE-THIRD TO JOSEPH BERRY AND ONE-THIRD TO RONALD BERRY, BOTH OF OATMAN, ARIZONA.

HYDROCARBON-BURNER.

1,098,721.  Specification of Letters Patent.  Patented June 2, 1914.

Application filed October 20, 1913. Serial No. 796,247.

*To all whom it may concern:*

Be it known that I, JAMES HALLSWORTH, a citizen of Great Britain, and having declared my intention of becoming a citizen of the United States, residing at Oatman, in the county of Mohave and State of Arizona, have invented new and useful Improvements in Hydrocarbon-Burners, of which the following is a specification.

My invention relates to that class of burners in which liquid hydrocarbon and steam or air are intermingled at or near the mouth of the burner and the object thereof is to provide a burner in which the liquid fuel and steam or air are thoroughly commingled and atomized whereby the greatest efficiency is obtained from the fuel.

A further object is to provide a burner which is cheap, simple in construction and operation and will not become clogged.

I accomplish these objects by the device described herein and illustrated in the accompanying drawings forming a part hereof in which:

Figure 1 is a central vertical section, partly in elevation of my device. Fig. 2 is a section on the line 2—2 of Fig. 1. Fig. 3 is a diagrammatic view of my device as connected to the oil and steam supplies in use.

My device consists preferably of an annular casing 5 provided with a bottom plate 6 preferably integral therewith and a cap plate 7 which forms a mixing chamber 8. Plates 6 and 7 are provided centrally thereof with hubs or bosses 9 and 10 having interiorly screw-threaded openings therethrough in which are received the ends of a fuel supply member 11. At one side casing 5 is provided with a rectangular nozzle 12 in which is cut a burner opening 13 which opens into mixing chamber 8. This burner opening consists preferably of a narrow rectangular slit which extends from the outer end of the nozzle into mixing chamber 8. A steam inlet 14 is provided in casing 5 at a point nearly opposite one side of the nozzle and is connected by pipe 15 to a steam supply (not shown).

Fuel supply member 11 is preferably a piece of shafting having screw threads cut on each end and a collar 16 integral therewith near the lower end thereof which collar is received in a recess 17 in the bottom plate 6 of casing 5. The threaded ends of the fuel supply member extend through the openings in hubs 9 and 10 in threaded engagement therewith and are further secured by nuts on the ends. A fuel inlet 18 extends longitudinally and centrally of member 11 from one end to near the center where it is connected by a transverse opening 19 with an annular groove 20 cut in the outer periphery of said member. A mixing wheel comprising a hub 21 having radially extending arms or paddles 22 is mounted to rotate upon member 11. Hub 21 is provided intermediate the paddles 22 with inlet ports 23 which ports connect chamber 8 with groove 20 in member 11. The outer end of inlet 18 is connected by pipe 24 with a fuel supply (not shown).

In the operation of my device oil will be admitted under suitable pressure into pipe 24 and through the fuel inlets into mixing chamber 8. At the same time steam will be admitted also under suitable pressure into supply pipe 15 and passes through inlet 14 into chamber 8 where it impinges upon paddles 22 and causes them to rotate thereby thoroughly mixing with the fuel and atomizing the same and forcing the mixture by centrifugal force out through burner opening 13.

While I have shown and described my device as being adapted to liquid fuel and steam it will be understood that it is equally adapted to liquid fuel and air and I do not limit myself to such use.

Having described my invention what I claim is:

1. A hydrocarbon burner comprising a cylindrical casing provided with a fan shaped burner nozzle on the periphery thereof extending outwardly therefrom; an annular mixing chamber in said casing; a narrow elongated burner opening extending transversely through said nozzle and communicating with said mixing chamber; a tangential steam inlet in the walls of said casing; a supply member passing transversely through said mixing chamber and secured to the top and bottom walls thereof; a rotatable paddle-wheel mounted on said supply member within said casing; a fuel inlet extending longitudinally of said supply member from one end to near the center thereof; and connections from said fuel inlet to the mixing chamber between each of the blades of said paddle-wheel.

2. A hydrocarbon burner comprising a cylindrical casing provided with a burner nozzle on the periphery thereof and a circular mixing chamber therein; a mixture outlet extending through said nozzle and communicating with said mixing chamber; a tangential expansible fluid inlet for said chamber in the walls of said casing; a fuel supply member extending transversely through said mixing chamber and secured to the top and bottom walls thereof; a rotatable paddle wheel mounted upon said supply member within said casing having a plurality of paddles, the edges of which are adapted to contact with the walls of said mixing chamber, a fuel inlet in said supply member and connections from said fuel inlet to said mixing chamber between each of the blades of said paddle wheel.

3. A hydrocarbon burner comprising a cylindrical casing having a circular rotor chamber therein; a rotatable paddle-wheel mounted in said chamber in contact with the walls thereof and being adapted to form a plurality of independent mixing chambers therein; said paddle wheel having a hub; an inlet chamber within said hub; a fuel inlet opening into said chamber at one side thereof; a connection from said chamber into each of said mixing chambers; a tangential expansible fluid inlet in said casing adapted to communicate with each of said mixing chambers at predetermined times and a burner opening in said casing communicating with said rotor chamber.

In witness that I claim the foregoing I have hereunto subscribed my name this 30th day of September, 1913.

JAMES HALLSWORTH.

Witnesses:
  Joseph Berry,
  Ronald Berry.

---

Copies of this patent may be obtained for five cents each, by addressing the "Commissioner of Patents, Washington, D. C."